(12) United States Patent
Newkirk

(10) Patent No.: US 10,750,334 B1
(45) Date of Patent: Aug. 18, 2020

(54) SYSTEMS, DEVICES AND RELATED METHODS FOR GENERATING XML MESSAGES FOR CURSOR ON TARGET APPLICATIONS

(71) Applicant: Stonewall Defense, LLC, Watervliet, NY (US)

(72) Inventor: Richard H. Newkirk, Slingerlands, NY (US)

(73) Assignee: Stonewall Defense, LLC, Watervliet, NY (US)

( * ) Notice: Subject to any disclaimer, the term of this patent is extended or adjusted under 35 U.S.C. 154(b) by 0 days.

(21) Appl. No.: 16/558,633

(22) Filed: Sep. 3, 2019

Related U.S. Application Data

(60) Provisional application No. 62/727,198, filed on Sep. 5, 2018.

(51) Int. Cl.
| | | |
|---|---|---|
| *H04W 24/00* | (2009.01) | |
| *H04W 4/18* | (2009.01) | |
| *H04W 4/20* | (2018.01) | |
| *H04W 4/12* | (2009.01) | |
| *H04W 4/029* | (2018.01) | |

(52) U.S. Cl.
CPC ............. *H04W 4/18* (2013.01); *H04W 4/029* (2018.02); *H04W 4/12* (2013.01); *H04W 4/20* (2013.01)

(58) Field of Classification Search
USPC ....................... 455/518, 456.2; 370/310; 1/1; 340/870.02; 705/2
See application file for complete search history.

(56) References Cited

U.S. PATENT DOCUMENTS

| | | | |
|---|---|---|---|
| 7,941,379 B1 * | 5/2011 | Newstadt | G06Q 20/40 705/50 |
| 9,584,667 B2 * | 2/2017 | Narayan | H04M 3/53391 |
| 9,963,242 B1 * | 5/2018 | Lockhart | B64D 43/00 |
| 2010/0198608 A1 * | 8/2010 | Kaboff | G06Q 10/06311 705/2 |
| 2011/0165892 A1 * | 7/2011 | Ristich | H04W 64/00 455/456.2 |
| 2011/0165905 A1 * | 7/2011 | Shuman | H04W 64/00 455/518 |
| 2012/0243465 A1 * | 9/2012 | Wohlford | H04B 7/2606 370/316 |
| 2015/0063071 A1 * | 3/2015 | Kieffer | G01S 1/72 367/134 |
| 2016/0198245 A1 * | 7/2016 | Rhoads | G01R 19/2513 340/870.02 |
| 2017/0093481 A1 * | 3/2017 | Cannon | H04B 7/18513 |

* cited by examiner

*Primary Examiner* — David Q Nguyen

(74) *Attorney, Agent, or Firm* — Capital Patent and Trademark Law Firm, PLLC

(57) ABSTRACT

Unique, compact XML messages that include geo-location data for Cursor-on-Target applications may be generated and transmitted using substantially less power as compared with existing systems.

20 Claims, 1 Drawing Sheet

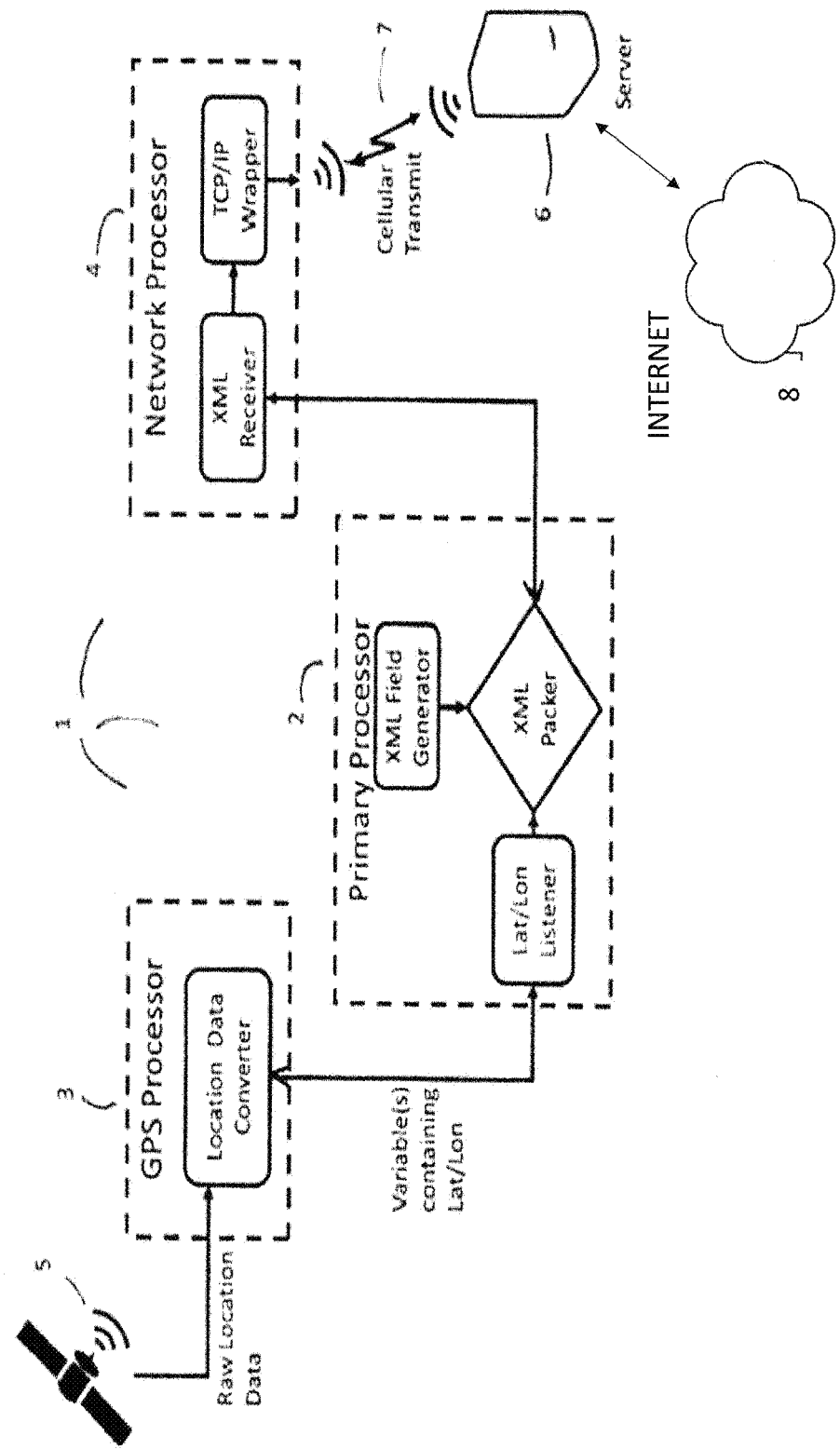

SYSTEMS, DEVICES AND RELATED METHODS FOR GENERATING XML MESSAGES FOR CURSOR ON TARGET APPLICATIONS

CROSS-REFERENCE TO RELATED APPLICATIONS

This application is related to, and claims the benefit of priority from, U.S. Provisional Application No. 62/727,198 filed Sep. 5, 2018 the contents of which are incorporated by reference herein, as if set forth in full herein.

INTRODUCTION

Extensible markup language (XML) is a well-known and widely used markup language that defines a set of rules for encoding documents in a format that is both human-readable and machine-readable. Many XML "schemas", or type of XML formats, exist. One type is commonly referred to as Cursor on Target (CoT). CoT is widely used by the Department of Defense (DoD) and other federal agencies to convey critical information, such as Global Positioning System (GPS) and other geo-spatial information, across computing platforms. Because of the complexity of existing XML schemas and the corresponding XML messages for CoT applications, such schemas and messages are typically generated by desktop, laptop, or embedded computing systems with significant processing power capabilities. Unfortunately, such platforms are not practical for tracking certain assets (e.g., individuals, equipment, devices, etc.,) on a smaller scale.

To overcome the disadvantages inherent in large-scale computing systems (e.g., their size) organizations began using applications hosted on mobile, battery-powered smartphones. While this addressed issues related to size, the power required to complete all of the processes was substantial and resulted in greatly reduced battery life.

For example, mapping applications such as the Android Team Awareness Kit (ATAK) have been developed for the purpose of providing increased situational awareness from top level command echelons to the lowest level of an individual operator. As just noted, however, a drawback of using such an application for the generation of XML messages at the individual level is that they are process-intensive and thus lead to dramatic increases in power consumption and corresponding reductions in battery life. Further, such complex applications sometimes result in unexpected "crashes" (malfunctions) in the application, and degraded performance due to the execution of extraneous processes inherent to smartphones. Additionally, such mapping applications have severely reduced operation times due to the limited battery life.

Though recent developments in smartphone technology have led to improved battery life performance and increased processing power (e.g., Samsung Galaxy S8 has an eight core 2.45 GHz processor, 4GB RAM, 64GB internal storage, and 3 mAh battery) in order to execute mapping applications, these benefits are not directly received by the end-user, and even less so by lower level users and tactical operators because the information exchanged and displayed on a smartphone may still be complex CoT messages. For example, in law enforcement and military environments lower level operators/users (hereafter "users") must be "eyes up" and aware of their immediate surroundings. Much like distracted driving, it may be extremely dangerous for a low-level operator to divert their attention to a smartphone screen for an extended period of time in order to view and comprehend complex CoT messages. That is to say, while commanders and team leaders may benefit from such developments, often lower-level users become overwhelmed and do not use the application. Accordingly, such devices end up being unused or discarded.

Still further, existing large-scale systems and devices used to generate and transmit XML messages corresponding to a mapping application in a tactical or operational environment must also comply with additional size, weight and power (SWaP) requirements. For example, existing devices are currently required to incorporate hardware, software, interfaces, programs, and processes referred to as "hardware and software" that are unrelated to a mapping application. The incorporation and control of such hardware and software requires additional power and leads to further reductions in battery life, consumes valuable network resources (e.g., bandwidth, data transmission and reception capabilities), and increases user errors.

Accordingly, it is desirable to provide for systems, devices and related methods that overcome the disadvantages of existing systems.

SUMMARY

The present invention provides for inventive, compact XML messages that allow for the tracking, and communication of tracking information (i.e., complete situational awareness with geo-spatial context), of an asset of interest within the coverage area of a cellular network.

Specific embodiments, features and advantages of the invention will become clear to those skilled in the art from the following detailed description and appended drawings.

BRIEF DESCRIPTION OF THE DRAWINGS

FIG. 1 depicts a simplified block diagram of a system according to embodiments of the invention.

To the extent that any of the figures or text included herein depicts or describes operating parameters (e.g., distance, times) or device model names or numbers it should be understood that such information is merely exemplary to aid the reader in understanding the embodiments described herein. It should be understood, therefore, that other parameters (e.g., distance, times) and device model names or numbers may be used to construct the inventive systems, devices and components and complete the inventive methods described herein and their equivalents without departing from the scope of the invention.

DETAILED DESCRIPTION, WITH EXAMPLES

Exemplary embodiments of systems, devices and related methods for generating XML messages for CoT applications are described herein and are shown by way of example in the drawing. Throughout the following description and drawing, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method.

Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

It should be understood that when the description herein describes the use of a "processor" or "electronic processor" that such a device includes stored, specialized instructions for completing associated, described and/or known features and functions. Such instructions may be stored in onboard memory or in separate memory devices. Such instructions are designed to integrate specialized functions and features into the processor that are used to complete inventive functions, methods and processes related to, among other things, the generation, transmission and reception of XML messages for CoT applications, for example.

Before continuing, it should be further noted that embodiments of the invention depicted in the figure and described in the text herein, and in particular the processing sections and processors, are configured with the necessary electronics to enable each to process data and signals much faster than humanly possible and to exchange data and signals with each other much faster than humanly possible. That is to say, each of the embodiments of the present invention cannot practically be implemented in any amount of time that would be acceptable to one skilled in the art using human beings as substitutes for the systems, devices, and methods described herein. For example, many of the embodiments described herein involve an exchange of data and signaling information between two physical devices or components, where the data and signaling information exchanged must be available for immediate use by another physical device or element or for display to a user. Accordingly, the speeds at which the data and signaling information is exchanged, and the amount of data and signaling information exchanged, is many times faster and greater than that which can be communicated and processed by the human mind. Nor can such data and signaling information be displayed by the human mind or mechanical means (pen and paper) within the time periods demanded by users of the present invention and those skilled in the art of the present invention.

It should be understood that the phrase "integral" means one or more components that are constructed substantially as one unitary device where, generally speaking, the components are connected using short conductors or connectors, are placed on one or more adjacent printed circuit boards or the like that are themselves connected or are formed as a one or more miniaturized integrated circuits (i.e., "chip").

As described herein, the inventors have discovered systems, devices and related methods for generating and transceiving unique, compact XML messages (e.g., frames that are less than 5 kilobytes) that may be used to convey CoT information. In embodiments, the compact XML messages may comprise one or more indicators representing time, location, and unit designation. Further, an exemplary XML message may be "wrapped" or otherwise include TCP/IP data bits.

Referring now to FIG. 1, there is depicted a system 1 for generating and transceiving unique, compact XML messages for CoT applications. In the embodiment shown in FIG. 1 the system 1 may comprise a primary processing section 2, a GPS processing section 3 and a network interface processing section 4. Each of the processing sections may further comprise one or more electronic processors (e.g., microprocessors, microcontrollers) for completing the features and functions described herein. Though FIG. 1 depicts the three sections as distinct sections, it should be understood that one or more of the sections may be combined so that there are fewer sections, or, alternatively, further broken down into additional sections (and processors). That said, in an embodiment, each and every one of the three sections (and their corresponding electronic circuitry, processors) may comprise a single, integral electronic "chip". Further, all three processors and their associated features and (described herein) may be integrated into a single integral chip to reduce the need to use a substantial amount of processing cycles and power.

It should be noted that the simplified block diagram in FIG. 1 is not meant to depict all of the electronics or components that are necessary for a commercial version of an inventive device that makes use of the features and functions of any disclosed or claimed invention. For instance, it should be understood that a commercial embodiment would include a power source (e.g., re-chargeable battery). Instead, the simplified block diagram in FIG. 1 is merely presented to allow the reader that is skilled in the art to gain a reasonable understanding of the features, functions and processes of embodiments of the invention.

In an embodiment, an exemplary, compact XML message that includes data bits representative of location information, for example, may be generated and transmitted using sections 2 through 4 by the execution of stored instructions (sometimes referred to as "native firmware") that may further comprise one or more applications (e.g., a mapping application) to convey geo-spatial contextual information. Further, the inventors have discovered how to generate, transmit, receive, distribute and thereafter further process such compact XML messages while overcoming the issues of battery life and network data consumption.

Referring again to FIG. 1, in one embodiment the GPS section 3 may comprise transceiving circuitry for receiving raw geo-location information from a respective satellite or satellites 5. The GPS processing section 3 may comprise a GPS data and signaling processor (GPS processor) that is operable to convert the received raw data and signaling (i.e., GPS data and signaling) into one or more values representative of geo-location information (e.g., longitude and latitude) that may be compatible with one or more geo-location standards or specifications recognizable by the primary processing section 2 so that the values may be parsed (i.e., processed) by the primary processing section 2. Said another way, values representative of GPS navigational messages must be in compliance with the Global Positioning System (GPS) Standard Positioning Service (SPS) Signal Specification (hereafter GPS-SPS messages). Accordingly, in an embodiment GPS processing section 3 may be operable to transmit or otherwise send the converted geo-location information (e.g., the GPS-SPS messages) to the primary processing section 2.

In an embodiment, an exemplary GPS processor may comprise the U-Blox MAX-M8 series whose dimensions are 9.7×10.1×2.5 mm. This exemplary processor is operable to concurrently receive GPS-SPS data and signals from up to three (3) Global Navigation Satellite Systems (GNSS), with −167 dBm navigation sensitivity.

In embodiments of the invention, the primary processing section 2 may comprise a transceiver that is configured as an SPS transceiver and operable to receive and process the GPS-SPS messages from GPS processing section 3. In an embodiment, the SPS transceiver may be designed such that it is capable of processing data accurate to within 0.5 to 25 meters, preferably within the range of about 0.5-10 meters, and more preferably within the range of about 0.5-5 meters.

Continuing, in an embodiment the primary processing section 2 may comprise one or more processors, preferably one processor, operable to receive and process converted geo-location information (e.g., the GPS-SPS messages), and "package" (i.e., insert) the geo-location information to form a compact XML message that contains CoT applicable data bits in preparation for transmission to the network interface processing section 4.

In an embodiment, while all three sections (i.e., GPS processing section 2, primary processing section 3, and network interface processing section 4) are powering "on", the primary processing section 2 (that includes a primary processor) may be operable to detect converted GPS data bits (e.g., geo-location data, GPS-SPS messages) from the GPS processing section 3. Upon reception of such a message, the primary processing section 2 may be operable to retrieve a value, representing a time value, that is generated by internal clock generation circuitry within the primary processing section 2. In an embodiment, the primary processing section 2 may be operable to convert the retrieved time value to a standard or reference value, such as Greenwich Mean Time. Further, the primary processing section 2 may thereafter be operable to store the converted time value so that it may be used to create a compact CoT message formatted as an XML message that contains the converted time value and geo-location data (e.g., latitude and longitude). If, however, no valid GPS-SPS data (or signaling) is received from the GPS processing section 3, the primary processing section 2 may be operable to continue to attempt to detect valid data before retrieving the time value. In sum, once the GPS-SPS data is received and stored, the primary processing section 2 has all the information from external sources that it requires to generate compact, XML messages.

Backtracking somewhat, in an embodiment the primary processing section 2 may be operable to clear any residual or outdated geo-location information (e.g., GPS-SPS latitude, longitude data) from its memory and set major system variables upon starting up (i.e., upon "boot up"). The system variables may include one or more data bits representing one or more of the following: 1) Internet Protocol (IP) Address and Port number/identifier of a system/server 6 receiving situational awareness traffic, 2) stored referential data bits to be combined with geo-location data bits to form a compact XML message (i.e., retrieves mandatory data bits to combine with latitude and longitude data bits), and 3) time zone and format. In embodiments of the invention, the addresses may comprise IPv4 or IPv6 addresses. Said another way, the addresses may comprise an IP address that corresponds to the IP version of the server 6. Such addresses may be hard-coded and stored within memory of the primary processing section 2.

In an embodiment, the primary processing section 2 may be operable to generate a compact XML message for a CoT application by inserting the received, converted geo-location information (GPS-SPS data) into a stored, referential message that already comprises pre-determined CoT data bits that correspond to an exemplary, referential XML CoT schema. In embodiments of the invention, the pre-determined CoT data bits may be stored as firmware in memory of the primary processing section 2 (e.g., in a primary processor) and may comprise one or more of the following: 1) xml version, 2) how, 3) type, 4) unit identifier, 5) version, 6) debug flow tags, 7) GPS reporting interval.

Alternatively, the primary processing section 2 may be operable to generate a compact XML message that may comprise (a) the pre-determined CoT application data bits and (b) data received from the primary processing section 2 internal clock.

In embodiments of the invention, the data inserted may comprise one or more of the following: 1) stale time, 2) start time, 3) stop time, 4) latitude, and 5) longitude, for example, depending on whether it originates from the GPS processing section 3 or from an internal clock. TABLE 1 below sets forth an exemplary compact XML message:

TABLE 1:
// Define outbound XML message const char *TAKLITE_MSG ="<?xml version='1.0' standalone='yes'?>" "<event how=\"h-p\"" "stale=\"%s\"" "start=\"%s\"" "time=\"%s\"" "type=\"a-f-G-E\"" "uid=\"TAKLite\"" "version=\"2.0\">" "<detail>" "<_flow-tags_debug=\"%s\" />" "</detail>" "<point "lat=\"%.7f\"" "lon=\"%.7f\"/>" "</event>";

For the reader's reference, "stale time" is the length of time for which an XML message remains valid. In embodiments of the invention, the primary processing section 2 may be operable to detect and analyze signals from its internal clock to generate variable stale times having an exemplary format of 'start time'+'x', whereby 'x' is the number of seconds, for example, for which a geographic location should remain valid. Yet further, in embodiments, the primary processing section 2 may be similarly operable to generate variable 'stop time(s)' to accommodate a user's preference, for example.

It should be understood that, in embodiments, both a "stale time" and "stop time" value may be hard-coded and stored as data in the primary processing section 2, for example. Still further, the values of the "stale" and "stop" times may be selected by a given user and then stored. For example, a police department may have a particular procedure (e.g., a Technique, Tactic, and Procedure—TTP) that includes a rule where "location" data older than 60 seconds should not be relied upon in a search and seizure operation. Accordingly, a corresponding, exemplary 'stale time' may have a value of 59 seconds so that the system 1 is compliant with such a procedure.

In yet another embodiment, the primary processing section 2 may be operable to detect a signal representing a "current time" from its internal clock and store this as a variable to be used to determine (i.e. compute) for 'start time', 'stale time', and 'stop time'.

By creating and storing a referential XML message that already comprises pre-determined CoT data bits that correspond to an exemplary, referential XML CoT schema, the number of processing cycles needed by the primary processing section 2 (and its corresponding processor) to generate compact, XML messages for a CoT application may be substantially reduced in comparison with existing systems. Relatedly, the reduction in processing cycles leads to a reduction in power usage, and a corresponding increase in battery life.

For example, in an embodiment the system 1 provided by the present invention may use a reduced number of computational cycles such that a re-chargeable battery (not shown in FIG. 1) may be able to achieve a battery life of 16 or more hours from a consumer grade 3.7 Volt (V), 1200 milliAmphours (mAh) lithium polymer battery pack as compared to existing systems where the battery life may be half as much (e.g., 8 hours).

Continuing, upon creation of a compact XML message, the primary processing section 2 may be operable to transmit, forward or otherwise send the compact XML message(s) to the network interface processing section 4, for example, for additional preparation prior to transmission via network 7 (e.g., cellular network) to a central management system 6 (e.g., hardware servers).

In an embodiment, the network interface processing section 4 may be operable to generate a transmittable, compact XML message containing CoT applicable data bits from the compact XML message it receives from the primary processing section 2 by "wrapping" it with a Transmission Control Protocol (TCP) header and Internet Protocol (IP) header using previously defined destination information (e.g., IP address and port number) (i.e., the compact XML message data bits are inserted into a pre-defined TCP/IP data frame).

In an embodiment, after a compact, TCP/IP formatted XML message is generated, the network interface processing section 4 may be operable to initiate a TCP "handshake" process with a receiving system, such as network servers 6 via network 7. In an embodiment, once the network processing section 4 detects the creation of a successful TCP/IP connection with the receiving system 6, the network processing section 4 may be operable to transmit the compact, TCP/IP compatible XML message over network 7 and eventually to the Internet 8 where it may be received by another member of the network 7 and displayed and/or further analyzed.

In a further embodiment, rather than exchange compact XML messages with servers 6, such messages may be transmitted and received (i.e., communicated) between multiple systems 1 on a peer-to peer basis. In such an embodiment, the network interface processing sections 4 of each system 1 may be operable to store the necessary data and instructions to complete such peer-to-peer communications.

In an embodiment of the invention, the method of receiving raw GPS geo-location information, converting it to compatible latitude and longitude data bits (GPS-SPS data), creating a compact XML message using referential data bits, creating a TCP/IP compatible XML message and transmitting such a message to a receiving destination may be repeated continuously at pre-determined intervals that may be determined by a "reporting" interval stored in the primary processing section 2 until the system 1: (i) loses connection to its power source (e.g., the user shuts the power off), or (ii) until power is depleted.

In an embodiment, during a next, subsequent power cycle after power has been shut off or depleted, all stored information (e.g., geo-location information) is purged from the system and the methods described herein may be initiated or repeated.

In embodiments of the invention, the total weight of an exemplary version of system 1, including processor(s), the printed circuit or other substrates the processor(s) and electronics reside on, a cellular antenna (for communication over network 7), and a re-chargeable battery may weigh less than 0.25 lbs.

For the benefit of the reader, the inventors now present a description of some exemplary components and their specifications that may be used within system 1 depicted in FIG. 1. It should be understood that the following examples merely illustrate some of the features and functions of the invention. Those skilled in the art will recognize numerous variations that are within the spirit and scope of the present invention.

EXAMPLE 1

System 1 may comprise a lightweight printed circuit (PC) board that is configured to include a MAX-M8 GNSS processor (product of Ublox) as a processor used in the GPS processing section 3, a SARA-N2 LTE Cat NB1 cellular processor (product of Ublox) used in the network interface processing section 4, and an ATmega328P Microcontroller (product of Atmel) used as a processor in the primary processing section 2, for example. In addition, a 3.7V, 1200 mAh, lithium polymer (Lipo) battery pack may be used as a power source. In embodiments, such a system 1 may generate and transmit inventive, compact XML messages at a rate of one message every 5 seconds.

The inventors conducted experiments using such an exemplary system. Immediately following transmission and reception of the compact XML message the geo-location information that represented the location of an asset (or assets) included in the message was recorded and compared against the actual, verifiable location data of such an asset (assets). Out of 50 data samples, 87% of the geo-location data contained in a message represented a location(s) that was/were within 5 meters of the location of the actual asset, 8% were within 5-10 meters, and 3% were within 10-25 meters.

EXAMPLE 2

An alternative system was also experimentally tested. The alternative system includes the same components as Example 1 except a ZOE-M8B SiP (product of Ublox) was used as the primary processer in primary processing section 2 instead of the ATmega328P Microcontroller. The resulting accuracy was within 3% of the location of the actual asset.

EXAMPLE 3

A second alternative system was also experimentally tested using the identical system as in Example 1, except that compact XML messages were produced at one per every 2 seconds. That is, instead of generating one message every 5 seconds, messages were generated every 2 seconds though the resulting accuracies were similar to those in Example 1.

The inventors believe that the inventive, compact XML messages allow, for the first time, the tracking and communication of such tracking information (i.e., complete situational awareness with geo-spatial context) of all assets of interest anywhere in the world that are within the coverage area of a cellular network.

While exemplary embodiments have been shown and described herein, it should be understood that additional, complementary features and functions may be added such as the addition of a biometric sensor(s) and corresponding processing that detects the heartrate, for example, among other parameters of a user (i.e., asset) and includes such information as data bots within a compact, XML message that may be transmitted to a remote or local destination/central user for analysis (i.e.,, to determine the health of the individual asset).

It should be further understood that variations of the disclosed embodiments may be made without departing from the spirit and scope of the claims that follow.

I claim:

1. A system for generating and transceiving unique, compact XML messages, comprising:
    a GPS processing section for receiving raw geo-location information and converting the raw geo-location information and signaling information into values representative of geo-location information compatible with one or more geo-location standards;
    a primary processing section including a transceiver responsive to the converted geo-location information from the GPS processing section and a primary processor for retrieving a time value associated with the reception of the converted geo-location information, the primary processing section operable to generate a compact XML message by inserting the converted geo-location information into a referential message stored at the primary processing section, the referential message comprising pre-determined data bits that correspond to an exemplary, referential XML schema; and
    a network interface processing section responsive to the primary processing section for receiving the generated compact XML message, the network interface processing section generating a transmittable, compact XML message using previously defined destination information.

2. The system as defined in claim 1 wherein the XML scheme is a Cursor on Target (CoT) schema.

3. The system as defined in claim 2 wherein CoT scheme comprises one or more indicators representing time, location, and unit designation.

4. The system as defined in claim 1 wherein the generated unique, compact XML messages comprise frames that are less than 5 kilobytes.

5. The system as defined in claim 1 wherein
    the GPS processing section comprises a GPS data and signaling processor for converting the raw location data into values in compliance with the Global Positioning System (GPS) Standard Positioning Service (SPS) Signal Specification (GPS-SPS); and
    the primary processing section comprises an SPS transceiver.

6. The system as defined in claim 5 wherein the SPS transceiver is configured to process geo-location data accurate to within the range of about 0.5-25 meters.

7. The system as defined in claim 6 wherein the SPS transceiver is configured to process geo-location data accurate to within the range of about 0.5-10 meters.

8. The system as defined in claim 7 wherein the SPS transceiver is configured to process geo-location data accurate to within the range of about 0.5-5 meters.

9. The system as defined in claim 1 wherein the primary processing section is further operable to detect already-received converted geo-location information from the GPS processing section and retrieve a time value related thereto.

10. The system as defined in claim 1 wherein the primary processor of the primary processing section is further operable to convert the retrieved time value to a standard time value.

11. The system as defined in claim 10 wherein the standard time value is Greenwich Mean Time.

12. The system as defined in claim 1 wherein the referential message stored in the primary processing section comprises pre-determined CoT data bits that correspond to an exemplary, referential XML CoT schema.

13. The system as defined in claim 12 wherein the pre-determined CoT data bits are stored as firmware in a memory portion of the primary processing section.

14. The system as defined in claim 13 wherein the pre-determined CoT data bits comprise one or more data bits selected from the group consisting of: xml version, how, type, unit identifier, version, debug flow tags, and GPS reporting interval.

15. The system as defined in claim 1 wherein the data inserted by the primary processing section comprises one or more of: stale time, start time, stop time, latitude, and longitude.

16. The system as defined in claim 15 wherein stale time is defined as a length of time for which an XML message remains valid.

17. The system as defined in claim 1 wherein the network interface processing section is operable to generate a transmittable, compact XML message by wrapping the compact XML message with a Transmission Control Protocol (TCP) header and Internet Protocol (IP header using the previously-defined destination information.

18. A method of generating and transceiving unique, compact XML messages, comprising the steps of:
    receiving raw GPS geo-location information;
    converting the raw GPS geo-location information into latitude/longitude data bits;
    creating a compact XML message by inserting the converted geo-location information to a pre-defined referential XML message of a pre-defined schema to creating a unique, compact XML message;
    creating a TCP/IP compatible XML message from the unique, compact XML message; and
    transmitting the TCP/IP compatible XML message to a receiving destination.

19. The method of claim 18 wherein the steps of receiving through transmitting are repeated continuously at a pre-determined time interval until power is removed from the system.

20. The method of claim 19 wherein upon re-starting a new power cycle, the method further includes the step of purging all stored geo-location information prior to receiving new raw geo-location information.

* * * * *